United States Patent [19]

Hakuraku et al.

[11] Patent Number: 4,457,135
[45] Date of Patent: Jul. 3, 1984

[54] MAGNETIC REFRIGERATING APPARATUS

[75] Inventors: Yoshinori Hakuraku; Hisanao Ogata; Takahiro Daikoku, all of Ibaraki, Japan

[73] Assignee: Hitachi, Ltd., Tokyo, Japan

[21] Appl. No.: 485,398

[22] Filed: Apr. 15, 1983

[30] Foreign Application Priority Data

Apr. 23, 1982 [JP] Japan ............... 57-67277

[51] Int. Cl.³ .................... F25B 21/02
[52] U.S. Cl. ..................... 62/3; 62/467
[58] Field of Search ................... 62/3, 467

[56] References Cited

U.S. PATENT DOCUMENTS 3,358,472  12/1967  Klipping .................. 62/467 X
4,033,734  7/1977   Steyert, Jr. et al. ........ 62/3
4,107,935  8/1978   Steyert, Jr. ............... 62/3
4,332,135  6/1982   Barclay et al. ............. 62/3

Primary Examiner—Lloyd L. King
Attorney, Agent, or Firm—Antonelli, Terry & Wands

[57] ABSTRACT

A magnetic refrigerating apparatus including a working material for performing magnetic refrigeration, and a magnetic field system capable of varying the distribution or intensity of a magnetic field impressed on the working material. When the working material produces heat on the high temperature side, heat exchange is performed by boiling heat transfer through a refrigerant on the high temperature side; when the working material absorbs heat on the low temperature side, heat exchange is performed by condensation heat transfer through a refrigerant on the low temperature side.

6 Claims, 6 Drawing Figures

MAGNETIC REFRIGERATING APPARATUS

BACKGROUND OF THE INVENTION

This invention relates to magnetic refrigerating apparatus comprising a working material for magnetic refrigeration and a magnetic field system capable of varying the distribution or intensity of a magnetic field impressed on the working material, and more particularly it is concerned with a magnetic refrigerating apparatus of the type disclosed suitable for achieving improved efficiency.

One type of magnetic refrigerating apparatus of the prior art known in the art which is of a reciprocation type is disclosed in U.S. Pat. No. 4,332,135. A magnetic refrigerating apparatus of the reciprocation type in which a working material is moved into and out of a high magnetic field in reciprocatory movement generally suffers the disadvantage that the moving parts are complex in construction and the apparatus is large in size. Another type of magnetic refrigerating apparatus which is of a rotary type is also known, as disclosed in U.S. Pat. No. 4,107,935. In this type, a working material is caused to flow into a rotary body, and this makes it essential to provide an airtight seal. Additionally, means should be provided for circulating a fluid, so that the apparatus becomes very complex in construction.

SUMMARY OF THE INVENTION

This invention has been developed for the purpose of obviating the aforesaid disadvantages of the prior art. Accordingly the invention has as its object the provision of a magnetic refrigerating apparatus of a stationary type capable of achieving improved efficiency.

The outstanding characteristic of the invention is that a working material for magnetic refrigeration is placed in a fixed position and a magnetic field impressed on the working material has its distribution or intensity varied periodically to constitute a refrigeration cycle. On the high temperature side of the refrigeration cycle, the entropy of the working material is reduced semiisothermally and the heat generated thereby is released to a refrigerant on the high temperature side by boiling heat transfer. On the low temperature side thereof, the heat is absorbed by a refrigerant on the low temperature side by condensation heat transfer.

According to the invention, there is provided a magnetic refrigerating apparatus of improved efficiency and high reliability in which the working material can be held stationary relative to two heat exchanging sections or the heat exchanging sections of the high and low temperature sides.

DESCRIPTION OF THE PREFERRED EMBODIMENTS

Preferred embodiments of the invention will now be described by referring to the accompanying drawings.

Figure 1:
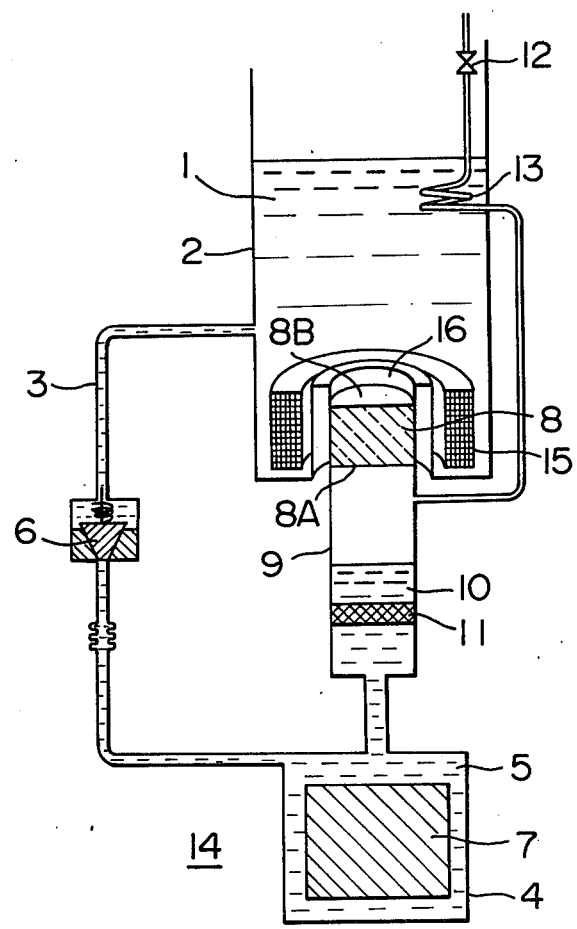
FIG. 1 is a sectional view of the magnetic refrigerating apparatus comprising one embodiment of the invention.

FIG. 1 shows one embodiment which operates in the vicinity of the liquid helium temperature range. A refrigerant 1 of the high temperature side which is ordinary liquid helium ($\sim$4.2 K, $\sim$1 atm) is contained in a container 2 connected through a connecting line 3 with a cooling chamber 4 having liquid helium 5 filled therein. The connecting line 3 has mounted therein a valve 6 serving as a safety valve during steady state operation which is a gap sealing valve including a conical valve body and a valve seat. During steady state operation, it is possible to provide a temperature gradient between the liquid helium ($\sim$4.2 K, $\sim$1 atm) 1 and the liquid helium ($\sim$1.8 K, $\sim$1 atm) 5 by the Gorter-Mellink phenomenon by virtue of the valve 6. Presurewise, communication is substantially maintained between the liquid helium 1 and liquid helium 5. Equipment to be cooled 7, such as superconductive coil, electronic equipment operable at very low temperature, etc., is contained in the cooling chamber 4. A working material 8 is located in a lower portion of the container 2 for performing magnetic refrigeration. The working material is a magnetic material such as $Gd_3Ga_5O_{12}$, $Gd_3Al_5O_{12}$, $Gd_2(SO_4)_3 \cdot 8H_2O$, etc. A heat transfer chamber 9 constituting a switching device of the low temperature side is located beneath a bottom surface 8A of the working material 8 and contains therein saturated liquid helium 10 about 0.2-0.4 time in volume the heat transfer chamber 9 which constitutes a heat pipe. The heat transfer chamber 9 which is formed of material of low heat transfer rate, such as stainless steel, ceramics, etc., has the working material 8 attached to its upper end to act as a unit therewith. A top surface 8B of the working material 8 is a heat transfer surface in contact with a heat transfer chamber 16 maintained in communication with the container 2. A heat exchanger 11 is located in such a manner that it is maintained in direct contact with the saturated liquid helium 10 and has a heat transfer surface allowing heat exchange to take place between the saturated liquid helium (1.79 K, 0.016 atm) 10 and the liquid helium (1.8 K, 1 atm) 5. The heat transfer surfaces of the working material 8 and heat exchanger 11 are finned or otherwise worked to increase the areas of their heat transfer surfaces. By the presence of the large areas of heat transfer surfaces, it is possible to essentially reduce the Kapitza resistance on these heat transfer surfaces.

Figure 2:
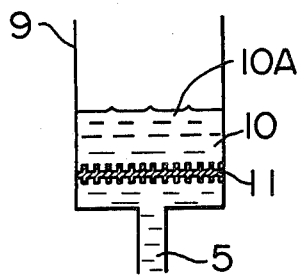
FIGS. 2 and 3 are views showing the heat exchanger in concrete form of the magnetic refrigerating apparatus shown in FIG. 1 in conformity with the invention.

FIG. 2 shows an example of the heat exchanger 11 in concrete form, in which the heat exchanger 11 is in the form of a plate having finned heat transfer surfaces on opposite sides. 10A is a liquid surface.

Figure 3:
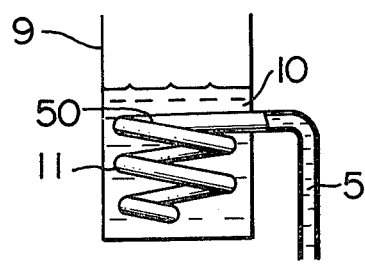

FIG. 3 shows another example in which the heat exchanger 11 is constituted by a pipe 50 for introducing the liquid helium 5 which is coiled at its end portion and placed in the liquid helium 10. The pipe 50 is closed at its coiled end.

The saturated liquid helium 10 is introduced into the heat transfer chamber 9 through a valve 12 and a heat exchanger 13. In steadystate operation, the valve 12 is closed to keep the amount of the saturated liquid helium 10 constant.

The essential portions of the magnetic refrigerating apparatus of the aforesaid construction are enclosed by a heat insulating vacuum portion 14. A high magnetic field generator 15 for causing the magnetic entropy of the working material 8 to vary is constituted by a superconductive magnet or the like immersed in the liquid helium 1.

The principle of operation of the magnetic refrigerating apparatus according to the invention will be described. In the embodiment shown and described hereinabove, the magnetic entropy of the working material 8 is increased and decreased by using a process wherein the intensity of a magnetic field impressed on the working material 8 is caused to vary to allow heat exchange to take place between the working material 8 and outside. More specifically, the working material 8 is securedly fixed in place and the high magnetic field generator 15 is moved vertically to thereby cause the intensity of a magnetic field impressed on the working material 8 to vary. Alternatively the value of a current passed to the high magnetic field generator 15 may be varied.

Another process for increasing or decreasing the magnetic entropy of the working material 8 may be used in which the working material 8 may be a material having magnetic anisotropy. In this case, the magnetic entropy of the working material 8 is varied by reversing the orientation of the lines of magnetic force, even if the intensity of the magnetic field remains unchanged. Thus the magnetic entropy of the working material 8 can be varied by various means.

Figure 4:
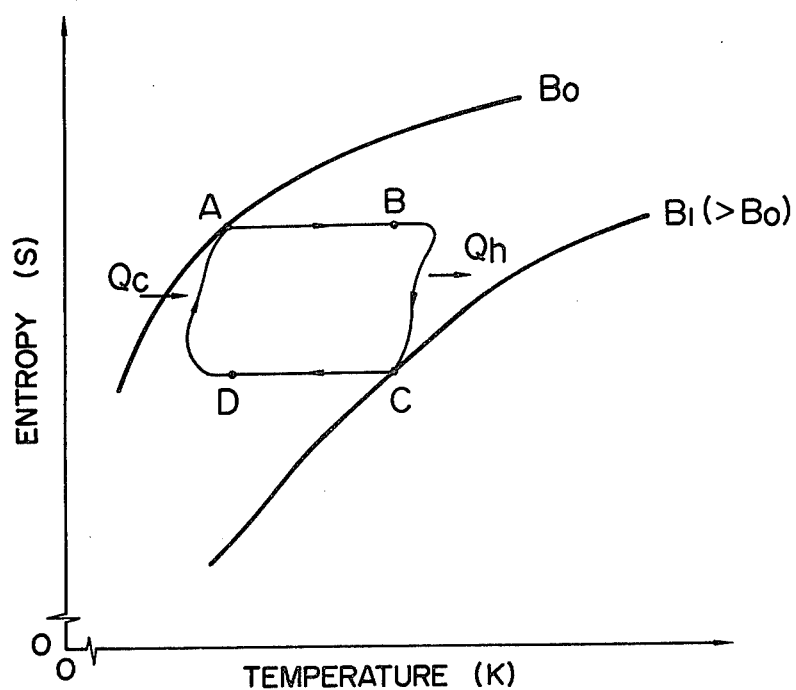
FIG. 4 is an entropy-temperature chart showing the operation of the refrigeration cycle of the magnetic refrigerating apparatus according to the invention.

The refrigeration cycle will be described by referring to FIG. 4. The magnetic refrigerating apparatus according to the invention operates in the Carnot cycle in reverse. In a process A-B, the magnetic field B adiabatically increases. In a process B-C, the magnetic field impressed on the working material 8 semiisothermally increases and the magnetic entropy decreases. At this time, a heat Qh generated is released by boiling heat transfer taking place between the working material 8 and liquid helium 1. The heat transfer surface of the working material 8 has been treated to improve its boiling heat transfer characteristic. The amount of heat exchanged between the working material 8 and the liquid helium 5 on the low temperature side is essentially governed by the conduction of heat through helium gas within the heat transfer chamber 9. Heat transfer difficultly takes place between the working material 8 and liquid helium 5 on the low temperature side, so that they are essentially thermally insulated from each other.

Then, the magnetic field substantially adiabatically decreases in a condition in which the magnetic entropy has decreased as aforesaid. Thus, the temperature of the working material 8 drops. In this process, heat exchange taking place between the liquid helium 1 and working material 8 is caused by the conduction of heat through the liquid helium 1. The liquid helium 1 has a very low thermal conductivity or $2 \times 10^{-4}$ Wcm$^{-1}$ K$^{-1}$, so that substantially no heat transfer takes place therethrough. However, heat is generated by the equipment 7 to be cooled and led to the liquid helium 5, from which it is transported through the heat exchanger 11 to the liquid helium 10 to cause same to vaporize to produce helium gas. The helium gas thus generated condenses in a process D-A on a condensation heat transfer surface (corresponding to the bottom surface 8A in FIG. 1) of the working material 8, to thereby transfer heat Qc to the working material 8. In this process, the working material 8 absorbs heat, resulting in an increase in entropy. In this process, the working material 8 and liquid helium 1 are substantially thermally insulated from each other as in the process C-D.

The aforesaid cycle A-B-C-D-A is periodically repeated to carry out a refrigeration operation.

Of the magnetic materials referred to hereinabove, $Gd_3Ga_5O_{12}$ is preferably used as the working material 8 because it gas excellent characteristics such that a great change is caused to occur in entropy by a magnetic field in a temperature range between 1.8 and 4.2 K and it has a high thermal conductivity.

Research shows that when $Gd_3Gd_5O_{12}$ is used as the working material 8 in a refrigeration operation in which the magnetic flux densities of the high and low magnetic field sides are set at 4 T (tesla) and substantially 0 T respectively, the heat transfer efficiencies on the high and low temperature sides are assumed to be substantially 100%, and the temperature on the low temperature side is 1.8 K, the magnetic refrigerating apparatus according to the invention has the refrigeration ability of about 0.25 $\nu$(J/cm$^3$) per unit volume of the working material, where $\nu$ is the frequency of the refrigeration cycle. At this time, the liquid helium 10 becomes saturated superfluid helium having a saturated vapor pressure of 12 mmHg, and the liquid helium 5 becomes sperfluid helium under the atmospheric pressure because it has a pressure of $\sim$1 atm through the valve 6.

In the foregoing description, ordinary liquid helium has been described as being used as a refrigerant on the high temperature side and superfluid helium has been described as being used as a refrigerant on the low temperature side. However, He$^3$ which is an isotope of He$^4$ may be used as a refrigerant in this temperature range. It is to be understood that the invention is not limited to the specific working temperature range described in the embodiment and that by using suitable refrigerants, it is possible to select any working temperature range as desired. For example, it would be possible to provide the refrigeration cycle having temperatures of below 4 K and 20 K is liquid helium were used as a refrigerant on the low temperature side and liquid hydrogen ($\sim$1 atm, $\sim$20 K) were used as a refrigerant on the high temperature side.

According to the invention, the working material 8 can be made stationary with respect to the heat exchanging refrigerants 1 and 10 in the process of heat exchange involving the working material 8 or when the working material 8 releases heat and absorbs it. As a result, heat transfer portions of the working material 8 can be subjected to any treatment as desired for improving their thermal conductivity, thereby enabling heat exchange to take place with a high degree of efficiency.

Pressure-wise, the liquid helium 5 and the saturated liquid helium 10 are separated from each other by the heat exchanger 11, so that it is possible to set the pressure of the liquid helium 5 at any level as desired without regard to the pressure of the saturated liquid helium 10. Thus subcooled liquid helium of excellent thermal characteristics can be used as the liquid helium 5.

Figure 5:
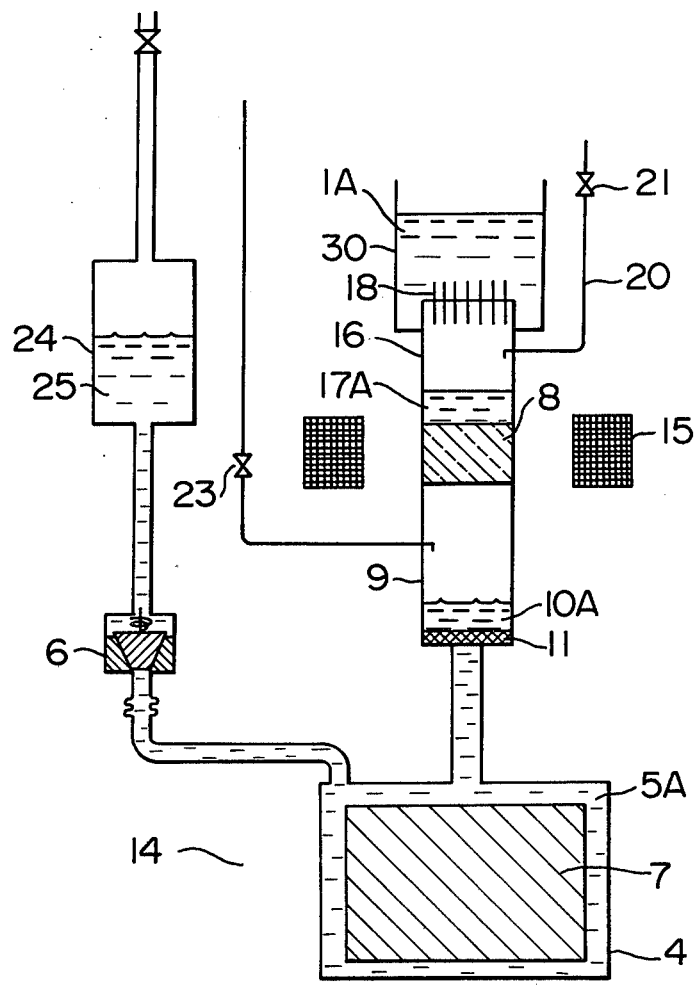
FIGS. 5 and 6 are sectional views of the magnetic refrigerating apparatus comprising other embodiments of the invention.

FIG. 5 shows another embodiment in which a high-temperature-side heat exchanging chamber 16 of a heat pipe construction is used to provide means for effecting heat exchange on the high temperature side or above the working material 8. The heat exchanging chamber 16 has a condenser section 18 at one end thereof. When liquid hydrogen ($\sim$1 atm) is used, for example, as a refrigerant in a cooling chamber 30, one only has to use saturated liquid hydrogen ($\sim$0.8 atm) and saturated liquid helium (0.01 atm) for the heat exchanging chamber 16 and the heat exchanging chamber 9 respectively. The numerals 20 and 21 designate a pipe and a valve, respectively, for introducing hydrogen 17 into the heat exchanging chamber 16, and the numeral 23 a valve adapted to be opened when helium 10 is sealed into the heat exchanging chamber 9 and closed in steadystate operation. Pressure-wise, a liquid helium 25 in a container is kept in communication with the liquid helium 5 through the valve 6.

Liquid helium He$^3$ (~0.13 atm) may be sealed into the heat exchanging chamber 9 and liquid helium He (1 atm) into the cooling chamber 4. In the embodiment shown in FIG. 5, the working material 8 operates on the low temperature side in the same manner as described by referring to the embodiment shown in FIG. 1. On the high temperature side, however, heat is transferred from the working material 8 to the liquid hydrogen A by boiling heat transfer through the liquid hydrogen 17 and condensation heat transfer occurring at the condenser section 18.

Figure 6:
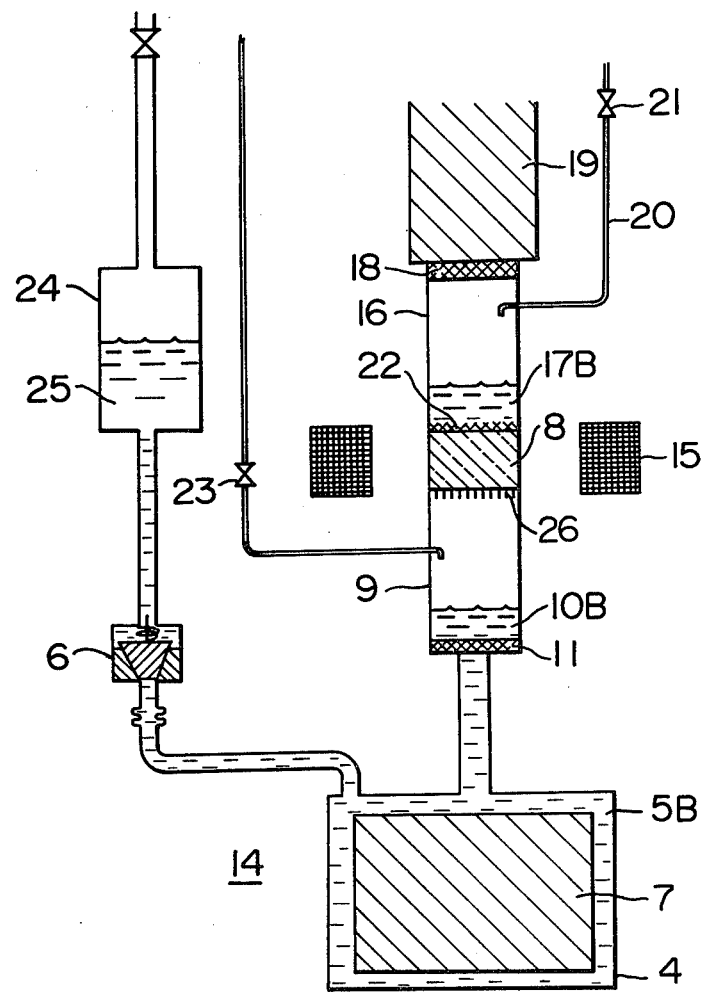

FIG. 6 shows still another embodiment in which the high-temperature-side heat exchanging chamber 16 of the heat pipe construction is also used to provide means for effecting heat exchange on the high temperature side or above the working material 8. In this embodiment, heat is transferred from the working material 8 to a cryo-cooler 19 by boiling heat transfer through the liquid hydrogen (20 K, 1 atm) 17 in the heat exchanging chamber 16 and condensation heat transfer occurring in the condenser section 18. By designing the cryo-cooler 19 to produce a very low temperature of 20 K, it is possible to provide a working temperature range of 1.8 to 20 K. Hydrogen gas is led through the pipe 20 and valve 21 to the high-temperature-side heat exchanging chamber 16 where it is condensed into the liquid hydrogen 17 which is about 0.2–0.4 time the volume of the heat exchanging chamber 16. The valve 21 is closed during steadystate operation, as is the case with the embodiment shown in FIG. 5. The cryocooler 19 for obtaining the low temperature of about 20 K may be of the Gifford McMahon cycle, Stirling cycle or Claude cycle.

When the temperature of the working material 8 becomes that of the low temperature side, the liquid hydrogen 17 would have a very low thermal conductivity, so that the working material 8 would absorb heat almost entirely through a condensation heat transmitting section 26. However, a substantial amount of heat would also be absorbed by the working material 8 from the high temperature side due to convection of the liquid hydrogen 17. A convection preventing member 22 is provided for avoiding convection of the liquid hydrogen 17. The convection preventing member 22 may be formed as of glass wool and placed on the top surface of the working material 8. The condensation heat transmitting section 26 on the bottom surface of the working material 8 may be provided with fins, for example, to promote conduction of heat.

What is claimed is:

1. In a magnetic refrigerating apparatus comprising:
   a working material formed of magnetic material;
   a magnetic field system capable of periodically varying the distribution or intensity of a magnetic field impressed on said working material; and
   means for transmitting heat to said working material; the improvement comprising:
   first heat exchanging means disposed at a low temperature end face of said working material for effecting heat exchange by condensation of a refrigerant; and
   second heat exchanging means disposed at a high temperature end face of said working material for effecting heat exchange by boiling of another refrigerant;
   wherein heat exchange is effected by the condensation heat transfer through said first-mentioned refrigerant in a process in which the working material absorbs heat and by the boiling heat transfer through said last-mentioned refrigerant in a process in which the working material release heat.

2. A magnetic refrigeration apparatus as claimed in claim 1, wherein said first heat exchanging means is firmly secured to a bottom surface of said working material and said second heat exchanging means if firmly secured to a top surface of said working material.

3. A magnetic refrigerating apparatus as claimed in claim 2, wherein said first heat exchanging means comprises a heat pipe comprising a heat transfer chamber having sealed therein a predetermined amount of saturated liquid refrigerant.

4. A magnetic refrigerating apparatus as claimed in claim 2, wherein said second heat exchanging means comprises a heat transfer chamber storing a liquid refrigerant therein.

5. A magnetic refrigerating apparatus as claimed in claim 2, wherein said second heat exchanging means comprises a heat pipe comprising a heat transfer chamber having sealed therein a predetermined amount of saturated liquid refrigerant.

6. In a magnetic refrigerating apparatus comprising:
   a working material formed of magnetic material;
   a magnetic field system capable of periodically varying the distribution or intensity of a magnetic field impressed on said working material; and
   means for transmitting heat to said working material; the improvement comprising:
   first heat exchanging means disposed at a low temperature end face of said working material for effecting heat exchange by condensation of a refrigerant;
   second heat exchanging means disposed at a high temperature end face of said working material for effecting heat exchange by boiling of another refrigerant; and
   third heat exchanging means connected to said first heat exchanging means via a heat exchanger, said third heat exchanging means comprising a chamber for receiving equipment to be cooled and a liquid refrigerant contained in said chamber whereby said equipment can be cooled by the heat absorbing action of said working material.

* * * * *